US010592842B2

(12) United States Patent
High et al.

(10) Patent No.: US 10,592,842 B2
(45) Date of Patent: Mar. 17, 2020

(54) METHODS AND SYSTEMS FOR LOADING PRODUCTS INTO A CARGO SPACE OF A DELIVERY VEHICLE

(71) Applicant: Walmart Apollo, LLC, Bentonville, AR (US)

(72) Inventors: Donald R. High, Noel, MO (US); Michael D. Atchley, Springdale, AR (US); David E. Ferrell, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 257 days.

(21) Appl. No.: 15/366,789

(22) Filed: Dec. 1, 2016

(65) Prior Publication Data

US 2017/0161673 A1    Jun. 8, 2017

Related U.S. Application Data

(60) Provisional application No. 62/262,285, filed on Dec. 2, 2015.

(51) Int. Cl.
G06Q 10/08 (2012.01)
(52) U.S. Cl.
CPC ................... *G06Q 10/083* (2013.01)
(58) Field of Classification Search
CPC .................................................. G06Q 10/083
See application file for complete search history.

(56) References Cited

U.S. PATENT DOCUMENTS 7,347,361 B2   3/2008 Lovett
7,543,741 B2   6/2009 Lovett
(Continued)

FOREIGN PATENT DOCUMENTS

CN    103303699    9/2013
EP    2083381      7/2009

OTHER PUBLICATIONS

"TOPS Pro: Packaging Design & Pallet Pattern Software." TOPS Pro and MaxLoad Pro Software for Package Design, Pallet Optimization, and Cargo Load Planning and Optimization, http://www.topseng.com/. (Year: 2015).*

(Continued)

*Primary Examiner* — Daniel Vetter
*Assistant Examiner* — Manal A. Alsamiri
(74) *Attorney, Agent, or Firm* — Fitch, Even, Tabin & Flannery, LLP (57) ABSTRACT

In some embodiments, methods and systems of loading products into a cargo space of a delivery vehicle for delivery to retail sales facilities are described. A computing device at a product distribution facility processes an electronic packing list including products to be loaded into the cargo space of the delivery vehicle and retrieves data from a database that may include size, weight, and product characteristic parameters for the products on the electronic packing list, size and shape parameters of the cargo space of the delivery vehicle, and packing rules for the at least one product on the electronic packing list. The data is used by the computing device to generate step-by-step instructions for loading the products on the electronic packing list in a determined orientation and into a determined location in the cargo space of the delivery vehicle.

18 Claims, 3 Drawing Sheets

(56) References Cited

U.S. PATENT DOCUMENTS

| | | | |
|---|---|---|---|
| 7,584,592 B2 | 9/2009 | Gabrielson | |
| 7,810,720 B2 | 10/2010 | Lovett | |
| 8,562,277 B2 | 10/2013 | Criswell | |
| 9,102,055 B1 | 8/2015 | Konolige | |
| 2005/0137933 A1* | 6/2005 | Holsen | G06Q 10/08 705/338 |
| 2007/0012602 A1* | 1/2007 | Baldassari | B07C 3/10 209/583 |
| 2007/0270999 A1* | 11/2007 | Chirnomas | G07F 17/10 700/221 |
| 2011/0078182 A1* | 3/2011 | Fenyes | G06Q 10/08 707/770 |
| 2012/0283868 A1 | 11/2012 | Rutt | |
| 2014/0050557 A1 | 2/2014 | Criswell | |
| 2014/0199142 A1 | 7/2014 | Criswell | |
| 2015/0094876 A1* | 4/2015 | Baldwin | G06Q 50/28 701/1 |
| 2015/0130592 A1* | 5/2015 | Lakshminarayanan | G06K 7/10297 340/10.1 |
| 2015/0168727 A1* | 6/2015 | Qaddoura | G02B 27/0172 345/156 |
| 2016/0047646 A1* | 2/2016 | Ochsendorf | G01B 11/28 348/148 |
| 2016/0224930 A1* | 8/2016 | Kadaba | G06Q 10/083 |

OTHER PUBLICATIONS

"Packer3d software press release"; http://www.packer3d.com/program/pressrelease; Nov. 9, 2015; (4 pgs.).

\* cited by examiner

FIG. 2

METHODS AND SYSTEMS FOR LOADING PRODUCTS INTO A CARGO SPACE OF A DELIVERY VEHICLE

RELATED APPLICATIONS

This application claims the benefit of U.S. Provisional Application No. 62/262,285, filed Dec. 2, 2015, which is incorporated herein by reference in its entirety.

TECHNICAL FIELD

This invention relates generally to delivery of retail products and, in particular, to the loading of products into a cargo area of a delivery vehicle for delivery to retail sales facilities.

BACKGROUND

Retail sales facilities such as large department stores typically receive products by way of delivery vehicles such as trucks. The trucks are typically loaded with the products to be delivered at a location such as a product distribution center or warehouse. The delivery trucks are typically loaded at a product distribution center or warehouse based on a loading worker's ability to tightly stack the products in the cargo space of the delivery vehicle and often without regard for how the products will be unloaded after being delivered to the intended retail sales facility. Typically, the workers who load the products into the cargo area of the delivery truck make on-the-spot decisions regarding the location and orientation of products to be loaded into the cargo space of the delivery truck/trailer. Such random loading of the products into the cargo space of delivery vehicles may result in product unloading inefficiencies at the receiving retail sales facilities as well as unintended damage to the products during delivery.

For example, since delivery trucks are often loaded with products destined for multiple retail sales facilities, situations often occur where some products intended for another retail sales facility have to be unloaded from the truck by the workers at a retail sales facility simply to permit other products that are intended for that retail sales facility to be unloaded from the truck. Then, the workers who unloaded the products actually intended for their retail sales facility are required to re-load the initially unloaded products (which were unloaded simply to permit unload of other products) back into the delivery truck to continue the trip to their ultimate destination.

The unloading of delivery trucks generally accounts for a third of the cost of operation of a retail sales facility. When workers at a retail sales facility have to unload products for longer periods of time from a delivery truck because the products are not optimally loaded into the cargo area of the delivery truck for unloading at the intended retail sales facility, the inefficiency resulting from non-optimal loading of products into the delivery trucks causes the retail sales facility to incur significant extra operation costs associated with product unload.

BRIEF DESCRIPTION OF THE DRAWINGS

Disclosed herein are embodiments of systems, apparatuses and methods pertaining to methods and systems for loading products into a cargo space of a delivery vehicle. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, this application describes systems and methods of loading products into a cargo space for delivery to one or more retail sales facilities. The products to be delivered are loaded into the cargo space of a delivery vehicle based on generated step-by-step product loading instructions indicating a location in the cargo space where each product is to be loaded and the orientation in which the product is to be loaded into the predetermined location. The step-by-step product loading instructions are generated based on various factors, including but not limited to product size and shape parameters, available space in the cargo area of the delivery vehicle, and packing rules such as intended destination of the products, stacking limitations of the products and special handling/storage instructions associated with the products.

In one embodiment, a method of loading products into a cargo space of a delivery vehicle includes: processing, at a computing device including a processor, an electronic packing list including at least one product to be loaded into the cargo space of the delivery vehicle; retrieving, using the computing device, from at least one database in communication with the computing device, data representing: at least one of size, weight, and product characteristic parameters for the at least one product on the electronic packing list; at least one of size and shape parameters of the cargo space of the delivery vehicle; and packing rules for the at least one product on the electronic packing list. The method further includes: determining, at the computing device and based on the data retrieved from the at least one database, a location and orientation in the cargo space of the delivery vehicle for loading the at least one product on the electronic packing list; calculating, at the computing device and based on the determining step, step-by-step instructions for loading the at least one product on the electronic packing list into the determined location and orientation in the cargo space of the delivery vehicle; and outputting, using the computing device and based on the calculating step, the step-by-step instructions for loading the at least one product on the electronic packing list into the determined location and orientation in the cargo space of the delivery vehicle.

In another embodiment, a system of loading products into a delivery vehicle includes at least one database including electronic data associated with at least one delivery vehicle and at least one product to be loaded into the at least one delivery vehicle and a computing device including processor-based control unit in communication with the at least one database. The control unit is configured to process an electronic packing list including at least one product to be loaded into the cargo space of the delivery vehicle and retrieve from the at least one database, the electronic data representing at least one of size, weight, and product characteristic parameters for the at least one product on the electronic packing list; at least one of size and shape parameters of the cargo space of the delivery vehicle; and packing rules for the at least one product on the electronic packing list. The control unit is further configured to: determine, based on the electronic data retrieved from the at least one database, a location and orientation in the cargo space of the delivery vehicle for loading the at least one product on the electronic packing list; calculate, based on the determination, step-by-step instructions for loading the at least one product on the electronic packing list into the determined location and orientation in the cargo space of the delivery vehicle; and output, based on the calculation, the step-by-step instructions for loading the at least one product on the electronic packing list into the determined location and orientation in the cargo space of the delivery vehicle.

In another embodiment, a system of loading products into a delivery vehicle includes: means for processing an electronic packing list including at least one product to be loaded into the cargo space of the delivery vehicle; means for retrieving from at least one database in communication with the computing device, data representing: at least one of size, weight, and product characteristic parameters for the at least one product on the electronic packing list; at least one of size and shape parameters of the cargo space of the delivery vehicle; and packing rules for the at least one product on the electronic packing list. The system further includes: means for determining, based on the data retrieved from the at least one database, a location and orientation in the cargo space of the delivery vehicle for loading the at least one product on the electronic packing list; means for calculating, based on the determining step, step-by-step instructions for loading the at least one product on the electronic packing list into the determined location and orientation in the cargo space of the delivery vehicle; and means for outputting, based on the calculating step, the step-by-step instructions for loading the at least one product on the electronic packing list into the determined location and orientation in the cargo space of the delivery vehicle.

Figure 1:
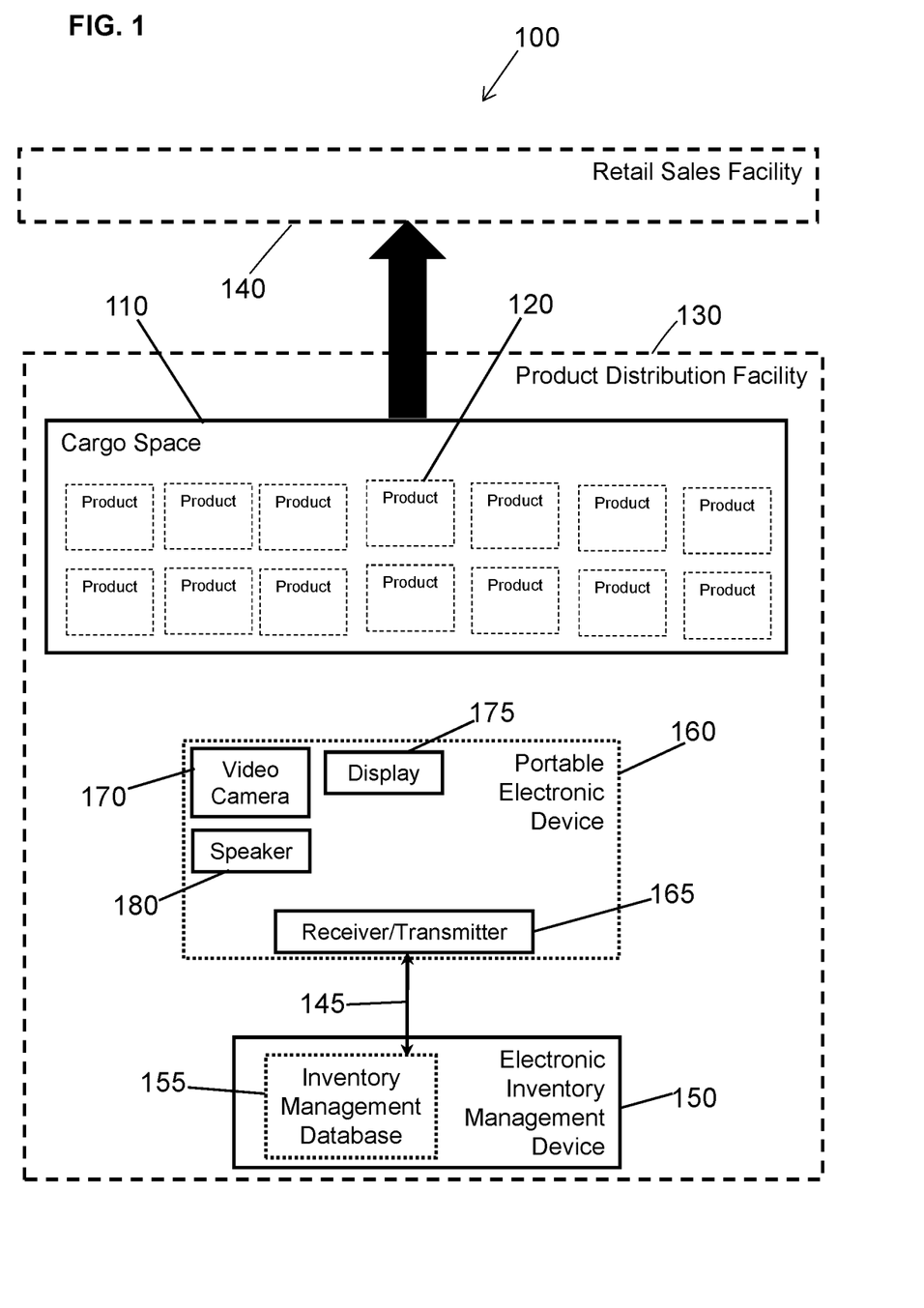
FIG. 1 is a diagram of a system for loading products into a cargo space of a delivery truck for delivery to a retail sales facility in accordance with some embodiments.

FIG. 1 shows one exemplary embodiment of a system 100 for loading products 120 into a cargo space 110 for delivery from a product distribution facility 130 to a retail sales facility 140. While the cargo space 110 may be an interior cargo area of a trailer of a delivery truck in one embodiment, the cargo space 110 may be an interior cargo area of any vehicle used to deliver goods including but not limited to a car of a train or a cargo area of a plane. The retail sales facility 140 may be any place of business (e.g., a brick-and-mortar store) where consumer products 120 are stocked and sold. While only one retail sales facility 140 is shown in FIG. 1, it will be appreciated that the cargo space 110 may contain products 120 destined for multiple retail sales facilities 140, and that a single retail sales facility 140 may receive product shipments via multiple delivery vehicles each having one or more cargo spaces 110.

In the embodiment shown in FIG. 1, the product distribution facility 130 includes an electronic inventory management device 150 that facilitates efficient loading of products 120 into the cargo space 110. It will be appreciated that the electronic inventory management device 150 may be located at a location remote to the product distribution facility 130 (e.g., on a server at a regional center). The electronic inventory management device 150 illustrated in FIG. 1 may be a stationary or portable electronic device including a processor-based control unit, for example, a desktop computer, a laptop computer, a tablet, a mobile phone, or any other electronic device configured for data entry and one-way and/or two-way communication with one or more other electronic devices located at the product distribution facility 130 and/or at locations (e.g., retail sales facility 140, regional server, or the like) remote to the product distribution facility 130. In the embodiment of FIG. 1, the electronic inventory management device 150 is configured to communicate with a portable electronic device 160 via a two-way communication channel 145, which may be provided via a wired or wireless connection.

The exemplary electronic inventory management device 150 of FIG. 1 includes an inventory management database 155 configured to receive and store electronic information regarding the products 120 to be delivered to the retail sales facility 140, as well as electronic information regarding the cargo space 110 of the delivery vehicles that may be used to deliver the products 120 to the retail sales facility 140. For example, for products 120 on an electronic packing list for loading into the cargo space 110 for delivery to one or more retail sales facilities 140, the inventory management database 155 may include electronic data representing one or more parameters associated with the products 120 to be loaded into the cargo space 110 for delivery to the retail sales facility 140. Such electronic data may include but is not limited to: size, weight, shape, and/or other product characteristic parameters associated with each of the products 120; size and shape parameters associated with the cargo space 110; and an electronic packing list and/or packing rules associated with the products 120.

The inventory management database 155 may be stored, for example, on non-volatile storage media (e.g., a hard drive, flash drive, or removable optical disk) internal or external relative to the electronic inventory management device 150. It will be appreciated that the inventory management database 155 does not have to be incorporated into or physically coupled to the electronic inventory management device 150, but may be stored on one or more servers remote to the product distribution facility 130 and in communication with the electronic inventory management device 150. In some embodiments, the electronic data stored in the inventory management database 155 may be entered into the electronic inventory management device 150 by a worker at the product distribution facility 130. Alternatively, the electronic data may be transmitted to the inventory management database 155 from a server (e.g., a server of the product manufacturer or a server of the delivery service operator) remote to the retail sales facility 140.

Figure 2:
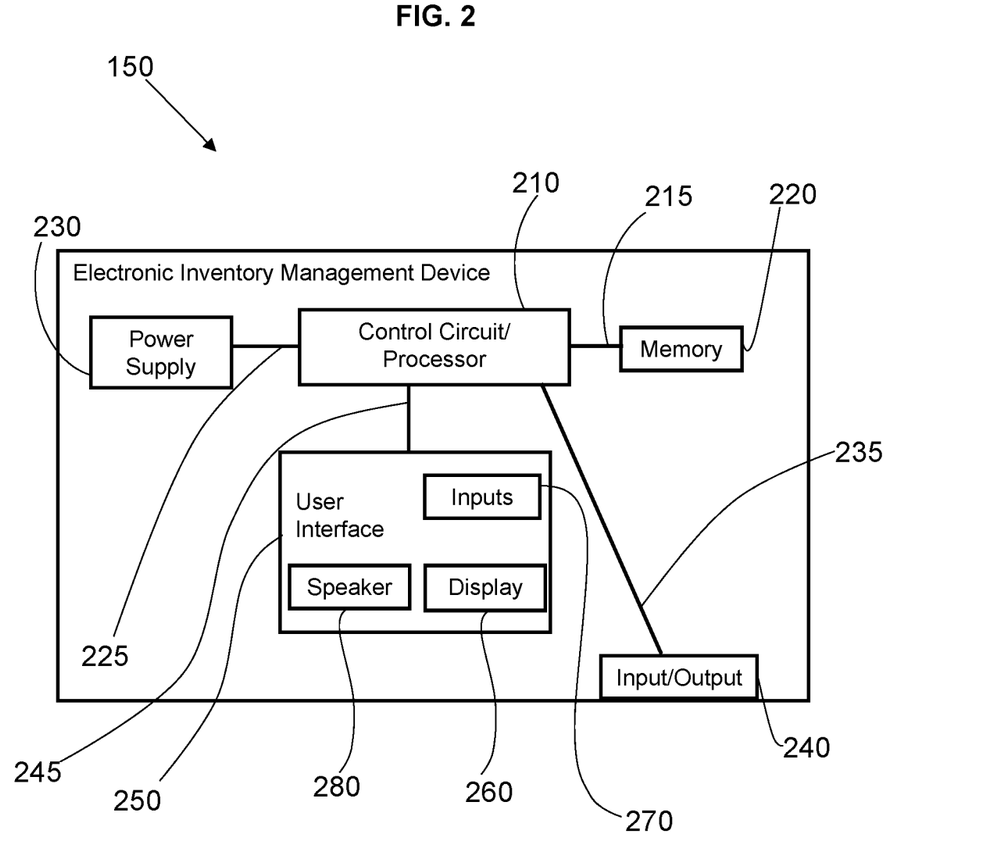
FIG. 2 is a functional diagram of an electronic inventory management device in accordance with several embodiments.

With reference to FIG. 2, the exemplary electronic inventory management device 150 of FIG. 1 is a computer-based device and includes a processor-based control circuit or control unit 210 (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description.

The control unit 210 of the electronic inventory management device 150 can be configured (for example, by using corresponding programming stored in the memory 220 as will be well understood by those skilled in the art) to carry out one or more of the steps, actions, and/or functions described herein. In some embodiments, the memory 220 may be integral to the control unit 210 or can be physically discrete (in whole or in part) from the control unit 210 and is configured non-transitorily store the computer instructions that, when executed by the control unit 210, cause the control unit 210 to behave as described herein.

As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM)). Accordingly, the memory 220 and/or the control unit 210 may be referred to as a non-transitory medium or non-transitory computer readable medium. The control unit 210 of the electronic inventory management device 150 is also electrically coupled via a connection 235 to an input/output 240 that can receive signals from and send signals (via a wired or wireless connection) to (e.g., commands, inventory database information), for example, devices local to the product distribution facility 130, or one or more devices remote to the product distribution facility 140.

In the embodiment shown in FIG. 2, the processor-based control unit 210 of the electronic inventory management device 150 is electrically coupled via a connection 245 to a user interface 250, which may include a visual display or display screen 260 (e.g., LED screen) and/or button input 270 that provide the user interface 250 with the ability to permit a user to manually control the electronic inventory management device 150 by inputting commands, for example, via touch-screen and/or button operation or voice commands. The display screen 260 can also permit the user to see various menus, options, and/or alerts displayed by the electronic inventory management device 150. The user interface 250 of the electronic inventory management device 150 may also include a speaker 280 that may provide audible feedback (e.g., alerts) to the user.

In some embodiments, the control unit 210 of the electronic inventory management device 150 of FIG. 2 is configured (e.g., by programming the processor) to determine, based on data representing at least one of size, weight, and product characteristic parameters for one or more products 120 on an electronic packing list, at least one of size and shape parameters of the cargo space 110 of the delivery vehicle, and one or more packing rules for the products 120, a loading location and orientation for each of the products 120 in the cargo space 110 of the delivery vehicle where the products 120 designated for delivery to the retail sales facility 140 are to be loaded. In some embodiments, the control unit 210 is programmed to generating the step-by-step instructions for loading the products 120 into the cargo space 110 based on packing rules including but not limited to: lighter cases and products on top of heavier products and cases, even weight distribution when stacking the products 120, maximum cube before the maximum weight is reached, crush factors, full pallet freight vs. non-full pallet freight, conveyable vs. non-conveyable freight, unloading order needed, or the like. The control unit 210 is programmed to process one or more of these factors to generate the step-by-step instructions for placing the products 120 onto a loading conveyor and/or stacking and orienting the products 120 in the cargo space 110 in an optimized way for safety of the products 120, shifting weight, and future unloading.

In some embodiments, the control unit 210 of the electronic inventory management device 150 is programmed to generate a visual or audible output for a worker at a product distribution facility 130 indicating step-by-step instructions specifying the order for loading the products 120 into the cargo space 110, the loading location of each product 120 in the cargo space 110, and the loading orientation of each of the products 120 in the cargo space 110. To that end, in the exemplary embodiment of FIG. 1, the system 100 includes a portable electronic device 160 which is configured for two-way communication (e.g., via a wireless communication channel 145) with the electronic inventory management device 150. Optionally, instead of or in addition to the portable electronic device 160 of FIG. 1, the system 100 may include a stationary electronic device (including a display and/or or a speaker) that is installed in the area of the product distribution facility 130 where products 120 are loaded into the cargo space 110 of a delivery vehicle.

The portable electronic device 160 may be an electronic hand-held device or an electronic hands-free device that may be used by a worker at the product distribution facility 130. Examples of such portable electronic devices 160 may include, but are not limited to: electronic tablets, cellular phones, optical devices including a display, mountable cameras or the like. In one embodiment, the portable electronic device 160 may be a head-mounted device including an optical display and an earpiece (e.g., Google Glass® or the like). It will be appreciated that any "hands-free" device having a display and/or audio capability and that may be mounted onto a uniform of a worker (e.g., shirt, hat, etc.) or directly in contact with the skin or hair of the worker may be used to provide video/audio for providing a worker at the product distribution facility 130 with visual and/or audible instructions for loading the products 120 into the cargo space 110. In some embodiments, the portable electronic device 160 may include a display 175 and/or a speaker 180 for providing a worker at the product distribution facility 130 with visual and/or audible instructions for loading the products 120 into the cargo space 110 of the delivery vehicle. The portable electronic device 160 may include lights of various colors that may provide instructions to the worker at the product distribution facility based on the light colors.

In the embodiment shown in FIG. 1, the electronic inventory management device 150 transmits (e.g., via its input output 240 shown in FIG. 2) electronic data including the step-by-step instructions for loading the products 120 into the cargo space 110 to the portable electronic device 160 by way of a two-way communication channel 145, which may be a wired or wireless connection. The exemplary portable electronic device 160 includes a camera 170 configured to acquire a (real-time) video feed or a snap photograph of the cargo space 110 as the worker is loading the products 120 into the cargo space 110 of a delivery vehicle. In some embodiments, the video camera 170 of the portable electronic device 160 may capture electronic data indicating the order of the loading of the products 120 into the cargo space 110 and/or the location of the loaded products 120 in the cargo space 110 by capturing the unique identifiers of the products 120, such as RFID, barcode, image recognition, or the like.

The portable electronic device 160 of FIG. 1 also includes a receiver/transmitter 165 configured to transmit the video feed or photographic snap shots acquired by the video camera 170 to the electronic inventory management device 150 (via communication channel 145). The control unit 210 of the electronic inventory management device 150 is programmed to correlate the received video feed or photographic snap shots indicating the location, orientation, and/or order of the products 120 being loaded into the cargo space 110 to the electronic step-by-step instructions which were transmitted to the portable electronic device 160 of the worker (and stored in the inventory management database 155). This correlation by the control unit 210 permits the control unit 210 to determine whether the worker is loading the products 120 into the cargo space 110 according to the step-by-step instructions transmitted from the electronic inventory management device 150 to the portable electronic device 160 of the worker, or if the worker has loaded the products 120 into the cargo space 110 in deviation of the step-by-step instructions.

In the event that this correlation of the received video feed or photo data by the control unit 210 indicates that the worker did not adhere to the step-by-step instructions transmitted by the electronic inventory management device 150 to the worker's portable electronic device 160, in one embodiment, the control unit 210 of the electronic inventory management device 150 is programmed to generate and transmit an alert to the portable electronic device 160 indicating that the location and/or orientation of the products in the cargo space 110 is not acceptable. In another embodiment, when a deviation from the step-by-step instructions by the worker in loading the products 120 is detected by the control unit 210, the control unit 210 is programmed to correlate the location and orientation of the products 120 that were loaded into the cargo space 110 so far relative to the locations and orientations in the original step-by-step instructions generated by the control unit 210, and then calculate and generate modified step-by-step instructions based on which subsequent products 120 may be loaded into the cargo space 110. These control unit 210 may then transmit the modified step-by-step instructions to the portable electronic device 160 such that, despite the deviation from the initial step-by-step loading instructions, the worker may resume loading the products 120 in an optimized sequence, location and orientation as determined by the control unit 210.

In some embodiments, the product distribution facility 130 may include one or more product distribution conveyors which may be used to deliver the products 120 from a sorting area at the product distribution facility 130 to the loading area where the products 120 to be delivered are loaded into the cargo space 110 of one or more delivery vehicles. In some embodiments, the control unit 210 of the electronic inventory management device 150 is programmed to transmit, to a portable electronic device 160 of a worker who loads the products 120 onto a product distribution conveyor, instructions indicating an order in which the products 120 are to be placed on the product distribution conveyor. In other words, the portable electronic device 160 may receive step-by-step instructions from the electronic inventory management device 150 and generate (visual and/or audible) step-by-step instructions to a worker at the product distribution facility 130 to guide the worker to load the products 120 (e.g., eaches, cases, or pallets) onto the product distribution conveyor in a specific order. This specific order in which the products 120 are to be loaded onto the product distribution conveyor and transported to the product loading area of the product distribution facility 130 corresponds to the order for loading the products 120 into the cargo space 110 as specified in the step-by-step loading instructions generated by the control unit 210. This advantageously enables the worker to remove the products 120 as they arrive on the product distribution conveyor and load the products 120 into the cargo space 110 in the correct order without having to reorganize the products taken off the product distribution conveyor in order to match the loading order specified by the step-by-step loading instructions.

In some embodiments, the control unit 210 of the electronic inventory management device 150 is programmed to transmit, to a portable electronic device 160 of a worker who takes the products 120 off a product distribution conveyor and loads the products 120 into the cargo space 110, loading instructions indicating the order in which the products 120 are to be taken off the product distribution conveyor. This may ensure that the worker removes the products 120 from the product distribution conveyor in an order that corresponds to the order in which the products 120 are to be loaded into the cargo space 110 according to the step-by-step instructions generated by the control unit 210.

Figure 3:
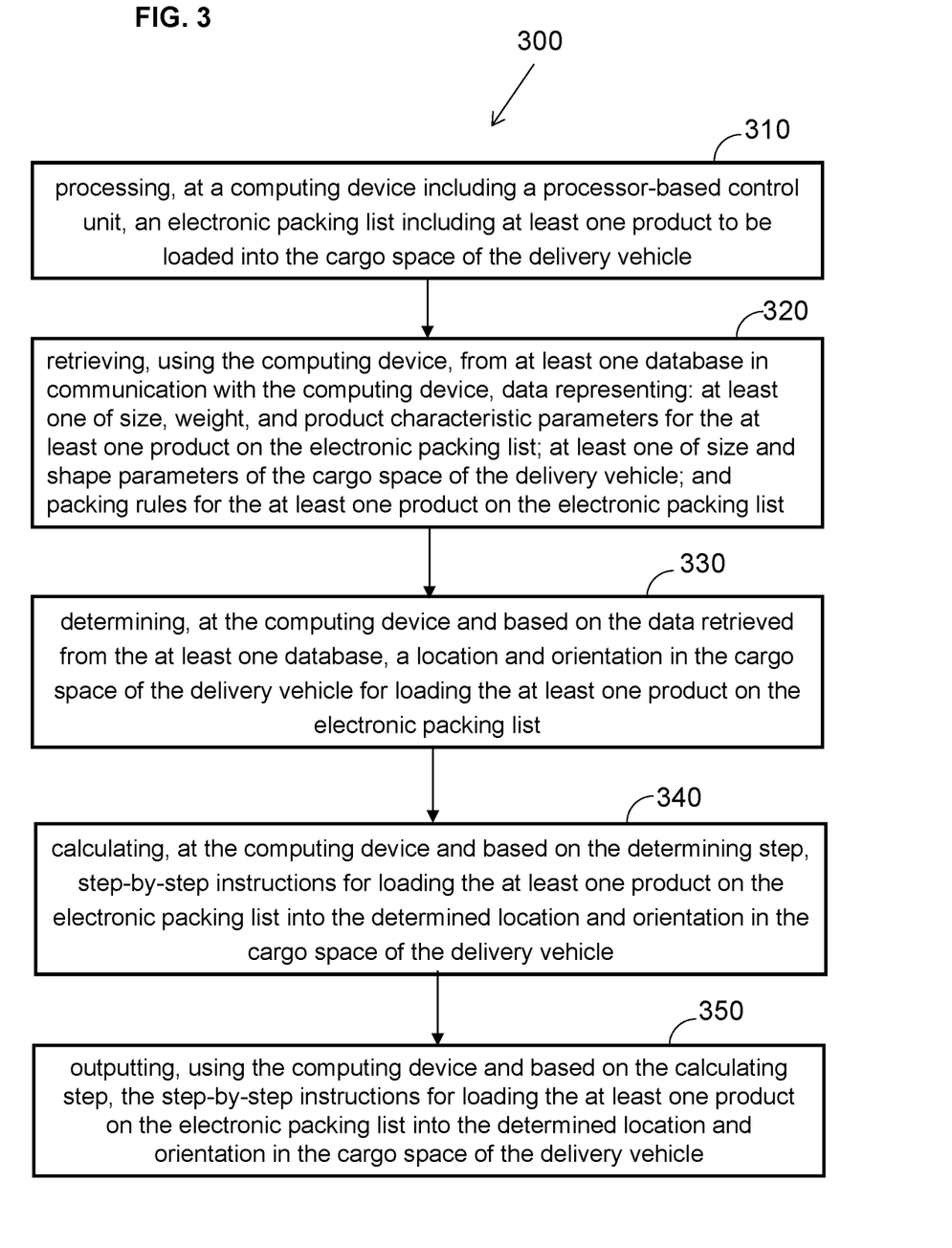
FIG. 3 is a flow diagram of a process of loading products into a cargo space of a delivery truck for delivery to a retail sales facility in accordance with some embodiments.

With reference to FIGS. 1-3, one method 300 of operation of the system 100 for load products 120 into a cargo space 110 of a delivery vehicle (e.g., a trailer of a delivery truck) at a product distribution facility 130 will now be described. For exemplary purposes, the method 300 is described in the context of the system 100 of FIG. 1, but it is understood that embodiments of the method 300 may be implemented in the system 100 or other systems.

In some embodiments, before a cargo space 110 of a delivery truck is loaded with products 120 to be delivered to the retail sales facility 140, an "electronic packing list" listing the products 120 to be delivered from the product distribution facility 130 to one or more retail sales facilities 140 is generated by the control unit 210 of the electronic inventory management device 150. In some embodiments, the electronic packing list may be generated by the control unit 210 in response to an input (i.e., request) by a worker at the product distribution facility 130, which may be entered by the worker via the inputs 270 of the electronic inventory management device 150. In some embodiments, the electronic packing list may be generated at a computing device in a location remote to the product distribution facility 130 (e.g., regional center or retail sales facility 140) and transmitted via a wired or wireless signal to the electronic inventory management device 150. The electronic packing list of products 120 to be delivered to the retail sales facility 140, once generated, may be temporarily or permanently stored in the inventory management database 155 of the electronic inventory management device 150.

After an electronic list of products 120 to be delivered to the retail sales facility 140 from the product distribution facility 130 is generated as discussed above, in the exemplary process of FIG. 3, the control unit 210 is programmed to process the electronic packing list of products 120 to be loaded into the cargo space 110 of the delivery vehicle at the product distribution facility 130 (step 310). In one embodiment, the control unit 210 of the electronic inventory management device 150 is programmed to process an electronic packing list by retrieving information on the electronic packing list including but not limited to a list of retail sales facilities 140 where products 120 are to be delivered, a list of products 120 to be delivered to the retail sales facilities, and/or a list of delivery vehicles to be used for delivering the products 120 to the retail sales facilities 140. It will be appreciated that the information retrieved as a result of the control unit 210 processing the electronic packing list may be retrieved from the inventory management database 155 incorporated into the electronic inventory management device 150, or obtained by the electronic inventory management device 150 from another computing device (e.g., an analytics server) local or remote relative to the product distribution facility 130.

After appropriate information is retrieved based on the processing of the electronic packing list, in the embodiment illustrated in FIG. 3, the control unit 210 is programmed to retrieve from the inventory management database 155 electronic data representing various parameters and rules associated with the products 120 on the electronic packing list which are to be loaded into the cargo space 110 for delivery to the retail sales facility 140. Such parameters and rules may associated with the products 120 include but are not limited to: size, weight, and/or product characteristic parameters for the products 120 on the electronic packing list; size, volume, and/or shape parameters of the cargo space 110 of the delivery vehicle; and packing rules for the products 120 on the electronic packing list (step 320). It will be appreciated that the electronic inventory management device 150 may be configured such that such parameters and rules relating to the products 120, instead of being obtained from the inventory management database 155 (which is physically incorporated into or physically coupled to the electronic inventory management device 150), may be obtained via a wired or wireless connection from an electronic database located remotely to the product distribution facility 130.

In some embodiments, the electronic data representing the characteristic parameters associated with each of the products 120 on the electronic packing list, and which may be obtained by the electronic inventory management device 150 from the inventory management database 155, may include various physical attributes of a product 120, including but not limited to: size of the product 120 (e.g., length, width, height), weight of the product, special storage instructions associated with the product 120, special handling instructions associated with the product 120, and the intended retail sales facility 140 where the product 120 is to be delivered. In some embodiments, the electronic data associated with the products 120 on the electronic packing list may also include a 3D model of each of the products 120. The 3D models of the products 120 may be generated by scanning each of the products 120 using conventional 3D scanners.

The electronic data representing size and shape parameters specific to the cargo space 110 in which the products 120 will be delivered to the retail sales facility 140, and which may be obtained by the electronic inventory management device 150 from the inventory management database 155, may include physical attributes of the cargo space 110 including but not limited to: total interior volume, length, width, height, shelf space, special storage compartments/areas, or the like. In some embodiments, the electronic data associated with the cargo space 110 may include a 3D model of the interior of the cargo space 110. In The 3D models of the cargo space 110 may be generated by scanning each of the products 120 using conventional (stationary or mobile) 3D scanners.

In some embodiments, after the control unit 210 of the electronic inventory management device 150 retrieves from the inventory management database 155 the 3D models of each of the products 120 to be delivered and a 3D model of the cargo space 110 in which the products 120 will be delivered, the control unit 210 is programmed to correlate the 3D model of the cargo space 110 to the 3D models of the products 120 to be loaded into the cargo space 110. Such correlation processing by the control unit 210 permits the control unit 210 calculate a location, orientation, and sequential order of loading the products 120 into the cargo space 110 that would facilitate an optimally efficient loading of the cargo space 110 with the products 120.

The term "packing rules" may refer any rule that may be interpreted by the control unit 210 as governing how a product 120 is to be loaded and/or stacked and/or transported in the cargo space 110 of the delivery vehicle. Such packing rules may include but are not limited to: lighter cases/products on top of heavier cases/products, evenly distributed weight of the load, maximum cube before reaching maximum weight, crush factors, full pallet freight vs. non-full pallet freight, conveyable freight vs. non-conveyable freight, necessary unloading order, specific destination of the products 120, fragile products 120, perishable products 120, frozen products 120, refrigerated products 120, ambient temperature storage products 120, and bulk products 120.

In the exemplary method 300 illustrated in FIG. 3, the control unit 210 of the electronic inventory management device 150 is programmed to determine, based at least on the above-discussed electronic data retrieved from the inventory management database 155, a location and orientation for loading each of the products 120 into the cargo space 110 of the delivery vehicle in which the products 120 to be delivered to the retail sales facility 140 (step 330). In one embodiment, the control unit 210 may be programmed to determine a location, orientation, and loading order of products 120 into the cargo space 110 based on a 3D model and weight of the products 120 to be delivered, a 3D model of the cargo space 110, and a packing rule such as the destination retail sales facility 140 for the products 120.

As shown in FIG. 3, after the loading location and orientation of each of the products 120 in the cargo space 110 of the delivery vehicle is determined by the control unit 210 of the electronic inventory management device 150, the control unit 210 is programmed to calculate step-by-step instructions for loading each of the products 120 listed on the electronic packing list into the determined location and orientation in the cargo space 110 of the delivery vehicle (step 340). In some embodiments, the control unit 210 is programmed to request and check the credentials of the user of the portable electronic device 160, such as a worker assigned to loading the products 120 into the cargo space 110. Such a credential check may involve generating a prompt on the portable electronic device 160, requiring the user of the portable electronic device 160 to enter a unique ID or passcode and transmit this ID or passcode back to the electronic inventory management device 150.

Then, if the ID or passcode entered by the worker constitutes a match to the ID or passcode given to personnel authorized for loading the products 120, the control unit 210 is programmed to transmit the generated step-by-step loading instructions for loading one or more products 120 listed on the electronic packing list into the cargo space 110 of the delivery vehicle to the portable electronic device 160 of the worker. Conversely, if the ID or passcode entered by the worker does not match an ID or passcode given to personnel authorized for loading the products 120, the control unit 210 is programmed to restrict the worker from accessing the step-by-step product loading instructions and to send an error (e.g., "access denied") message to the portable electronic device 160 of the worker.

After the step-by-step instructions of a predicted optimal loading location, orientation, and order of the products 120 into the cargo space 110 are calculated by the control unit 210, the control unit 210 is programmed to generate an output including the step-by-step instructions for loading each of the products 120 into the cargo space 110 (step 350). Such an output may be transmitted from the input/output 240 of the electronic inventory management device 150 via the communication channel 145 to the portable electronic device 160 of a worker at the product distribution facility 130, and generated on the visual display 175 of the portable electronic device 160, or via the speaker 180 of the portable electronic device 160. In some embodiments, the output is a visible or audible step-by-step list of instructions configured for guiding the worker to load the products 120 into the cargo space 110 of the delivery vehicle in the location and orientation determined by the control unit 210 to be most efficient.

The control unit 210 of the electronic inventory management device 150 may be programmed to continuously and/or periodically monitor the loading progress of the products in order to verify that the worker who received step-by-step instructions for loading the products 120 into the cargo space 110 of the delivery vehicle is following the step-by-step instructions. In some embodiments, the worker may activate the portable electronic device 160 to take a snap shot or a video feed (e.g., via the video camera 170) while the worker is loading the products into the cargo space 110 of the delivery vehicle. The electronic data representing this photographic snap shot or video feed may be transmitted by the portable electronic device 160 (via the communication channel 145) to the electronic inventory management device 150.

As discussed above, in some embodiments, the control unit 210 of the electronic inventory management device 150 is programmed to correlate the video feed or photographic snap shots received from the portable electronic device 160 of the worker indicating the location, orientation, and/or order of the products 120 being loaded into the cargo space 110 to the electronic step-by-step instructions which were transmitted to the portable electronic device 160 of the worker (and stored in the inventory management database 155). This correlation by the control unit 210 permits the control unit 210 to determine whether the worker is loading the products 120 into the cargo space 110 according to the step-by-step instructions transmitted from the electronic inventory management device 150 to the portable electronic device 160 of the worker, or if the location and orientation of one or more of the products 120 loaded by worker into the cargo space 110 deviates from the location and orientation specified in the original step-by-step instructions.

In the event that the correlation of the received video feed or photo data by the control unit 210 indicates that the worker loaded all of the products 120 into the cargo space 110 of the delivery vehicle while following the sequential loading order, location, and orientation of the products 120 specified in the step-by-step instructions transmitted by the electronic inventory management device 150 to the worker's portable electronic device 160, the control unit 210 of the electronic inventory management device 150 may be programmed to generate a record of a successful loading of the cargo space 110 with the products 120, and to record an entry in the inventory management database 155 indicating such a successful loading of the products 120. Conversely, in the event that this correlation of the received video feed or photo data by the control unit 210 indicates that the worker deviated from the step-by-step instructions transmitted by the electronic inventory management device 150 to the worker's portable electronic device 160, the control unit 210 of the electronic inventory management device 150 may be programmed to generate and transmit an alert to the portable electronic device 160 indicating that the location and/or orientation of the products in the cargo space 110 is incorrect.

Optionally, when the correlation of the loading progress to the step-by-step loading instructions by the control unit 210 detects that the worker deviated from the step-by-step instructions, the control unit 210 is programmed to correlate the location and orientation of the products 120 that were loaded into the cargo space 110 so far relative to the locations and orientations in the original step-by-step instructions generated by the control unit 210, and then calculate and generate modified step-by-step instructions based on which subsequent products 120 may be loaded into the cargo space 110. The control unit 210 may then transmit the modified step-by-step instructions to the portable electronic device 160 such that, despite the deviation from the initial step-by-step loading instructions, the worker may resume loading the products 120 in an optimized sequence, location and orientation as determined by the control unit 210. In other words, the users of the portable electronic device 160 (e.g., product loading workers) may override the step-by-step instructions transmitted from the electronic inventory management device 150 to the portable electronic device 160, and the control unit 210 of the electronic inventory management device 150 is configured to process the overrides, adjustments, and/or deviations from the step-by-step loading directions made by the user and issue an alert indicating the deviation and/or generate modified step-by-step loading instructions intended to guide the worker to resume loading the products into the cargo space 110 in an order, location, and orientation calculated by the control unit 210 to be most efficient.

The systems and methods described herein provide for efficient loading of products into cargo areas of trucks for delivery to retail sales facilities. Such loading of products into the delivery trucks advantageously provides for more efficient stacking of the products in the cargo space of the delivery vehicle, safer transportation of the products, and more efficient retrieval of the products from the cargo area of the delivery vehicle when the products are delivered to the retail sales facilities. Accordingly, the systems and methods described herein advantageously provide for less product shifting and/or damage during transportation and reduce the time spent by workers in loading and unloading products into and out of delivery vehicles and thereby provide for significant cost savings to the retail sales facilities.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of loading products at a product distribution facility into a cargo space of a delivery vehicle, the method comprising:
processing, at a computing device including a processor-based control unit, an electronic packing list including at least one product to be loaded into the cargo space of the delivery vehicle;
providing at least one electronic database in communication with the computing device, the at least one electronic database storing data representing:
at least one of size, weight, and product characteristic parameters for the at least one product on the electronic packing list;
at least one of size and shape parameters of the cargo space of the delivery vehicle; and
packing rules for the at least one product on the electronic packing list;
retrieving, using the computing device, the data from the at least one electronic database;
providing at least one sorting conveyor at a product sorting area of the product distribution facility;
determining, at the computing device and based on the data retrieved from the at least one database, a location and orientation in the cargo space of the delivery vehicle for loading the at least one product on the electronic packing list;
calculating, at the computing device and based on the determining step, step-by-step instructions for:
loading the at least one product onto the at least one sorting conveyor at the product sorting area of the product distribution facility;
unloading the at least one product from the at least one sorting conveyor; and
loading the at least one product on the electronic packing list and unloaded from the at least one sorting conveyor into the determined location and orientation in the cargo space of the delivery vehicle; and
outputting, using the computing device and based on the calculating step, the step-by-step instructions for loading the at least one product on the electronic packing list into the determined location and orientation in the cargo space of the delivery vehicle;
storing data representing the step-by-step instructions for loading the at least one product on the electronic packing list into the determined location and orientation in the cargo space of the delivery vehicle in the at least one electronic database;
providing a portable electronic device in communication with the computing device, the portable electronic device including a video camera;
transmitting, from the computing device and to the portable electronic device, the step-by-step instructions for loading the at least one product on the electronic packing list into the determined location and orientation in the cargo space of the delivery vehicle;
acquiring digital images of the cargo space of the delivery vehicle by the camera of the portable electronic device during loading of the at least one product on the electronic packing list into the cargo space of the delivery vehicle, the digital images including video capture data depicting the cargo space of the delivery vehicle and a location and orientation of the at least one product on the electronic packing list as loaded into the cargo space;
receiving, at the computing device and from the portable electronic device, the digital images of the cargo space acquired by the camera of the portable electronic device during the acquiring step;
extracting, by the control unit of the computing device and from the digital images of the cargo space acquired by the camera, the video capture data to determine the location and the orientation of the at least one product as loaded within into the cargo space;
correlating, by the control unit of the computing device, the location and the orientation of the at least one product loaded into the cargo space represented by the extracted video capture data against the data stored in the at least one electronic database and representing the step-by-step instructions for loading the at least one product on the electronic packing list into the determined location and orientation in the cargo space of the delivery vehicle;
generating, via the control unit of the computing device, an alert in response to a determination by the control unit of the computing device during the correlating step that the location and orientation of the at least one product in the cargo space as represented by the extracted video capture data deviates from the location and the orientation of the at least one product indicated by the data representing the step-by-step instructions stored in the at least one electronic database for loading the at least one product into the cargo space; and
transmitting the generated alert from the computing device to the portable electronic device.

2. The method of claim 1, wherein the processing step further comprises receiving, at the computing device, the electronic packing list at the computing device from an electronic device remote to the computing device.

3. The method of claim 1,
further comprising retrieving a 3-dimensional model of each of the at least one product on the electronic packing list;
further comprising retrieving a 3-dimensional model of the cargo space of the delivery vehicle;
wherein the product characteristic parameters include at least one of fragile, perishable, frozen, refrigerated, ambient, and bulk designations; and
wherein the packing rules include at least one of lighter cases on top, even weight distribution, crush factors, weight shift, and unloading order.

4. The method of claim 1, wherein the determining step further comprises determining the location and orientation in the cargo space of the delivery vehicle for loading the at least one product on the electronic packing list based a delivery destination for the at least one product on the electronic packing list.

5. The method of claim 1, wherein the outputting step further comprises transmitting, from the computing device to an electronic processor-based device at a product loading location, the step-by-step instructions for loading the at least one product on the electronic packing list into the determined location and orientation in the cargo space of the delivery vehicle, and generating, on the electronic processor-based device at the product loading location, at least one of visual and audible output containing the step-by-step instructions.

6. The method of claim 1, wherein the outputting step further comprises checking credentials of a worker at a product loading location, and transmitting the step-by-step instructions for loading the at least one product on the electronic packing list into the determined location and orientation in the cargo space of the delivery vehicle to an electronic processor-based device of the worker when the checking step indicates that the worker is authorized to load the at least one product into the delivery vehicle, and refusing to transmit the step-by-step instructions to the electronic processor-based device of the worker when the checking step indicates that the worker is not authorized to load the at least one product into the delivery vehicle.

7. The method of claim 1, further comprises receiving, at the computing device and from the portable electronic device, during the loading the at least one product on the electronic packing list into the determined location and orientation in the cargo space of the delivery vehicle, product identifying data including at least one of barcode data, image recognition data, and radio frequency identification (RFID) data.

8. The method of claim 1, further comprising permitting a worker at a product loading location to deviate from the step-by-step instructions and, in response to an indication during the correlating step that at least one of sequence and location of the loading of the at least one product into the cargo space of the delivery vehicle deviates from the step-by-step instructions:
   determining, at the computing device and based at least on the digital images of the cargo space acquired by the camera of the portable electronic device during the acquiring step, a modified location and orientation in the cargo space of the delivery vehicle for loading subsequent products on the electronic packing list;
   recalculating, at the computing device and based on the determining step, modified step-by-step instructions for the loading of the subsequent products on the electronic packing list into the modified location and orientation in the cargo space of the delivery vehicle; and
   outputting, using the computing device and based on the recalculating step, the modified step-by-step instructions for the loading of the subsequent products on the electronic packing list into the modified location and orientation in the cargo space of the delivery vehicle.

9. A system of loading products at a product distribution facility into a cargo space of a delivery vehicle, the system comprising:
   at least one electronic database including electronic data associated with at least one delivery vehicle and at least one product to be loaded into the at least one delivery vehicle; and
   a computing device including a processor-based control unit in communication with the at least one electronic database; and
   a portable electronic device in communication with the computing device, the portable electronic device including a video camera configured to acquire digital images of the cargo space of the delivery vehicle by the camera of the portable electronic device during the loading of the at least one product on the electronic packing list into the cargo space of the delivery vehicle, the digital images including video capture data depicting the cargo space of the delivery vehicle and a location and orientation of the at least one product on the electronic packing list as loaded into the cargo space;
   at least one sorting conveyor at a product sorting area of the product distribution facility;
   wherein the control unit of the computing device is configured to:
      process an electronic packing list including at least one product to be loaded into the cargo space of the delivery vehicle;
      retrieve from the at least one electronic database, the electronic data representing:
         at least one of size, weight, and product characteristic parameters for the at least one product on the electronic packing list;
         at least one of size and shape parameters of the cargo space of the delivery vehicle; and
         packing rules for the at least one product on the electronic packing list;
      retrieve the data from the at least one electronic database;
      determine, based on the electronic data retrieved from the at least one electronic database, a location and orientation in the cargo space of the delivery vehicle for loading the at least one product on the electronic packing list;
      calculate, based on the determination, step-by-step instructions for:
         loading the at least one product onto the at least one sorting conveyor at the product sorting area of the product distribution facility;
         unloading the at least one product from the at least one sorting conveyor; and
         loading the at least one product on the electronic packing list and unloaded from the at least one sorting conveyor into the determined location and orientation in the cargo space of the delivery vehicle; and
      output, based on the calculation, the step-by-step instructions for loading the at least one product on the electronic packing list into the determined location and orientation in the cargo space of the delivery vehicle; and
   transmit, to the portable electronic device, the step-by-step instructions for loading the at least one product on the electronic packing list into the determined location and orientation in the cargo space of the delivery vehicle;
   transmit data representing the step-by-step instructions for loading the at least one product on the electronic packing list into the determined location and orientation in the cargo space of the delivery vehicle to the at least one electronic database;
   receive, from the portable electronic device, the digital images of the cargo space acquired by the camera of the portable electronic device during the acquiring step;
   extract, from the digital images of the cargo space acquired by the camera, the video capture data to determine the location and the orientation of the at least one product as loaded within into the cargo space;
   correlate the location and the orientation of the at least one product loaded into the cargo space represented by the extracted video capture data against the data stored in the at least one electronic database and representing the step-by-step instructions for loading the at least one product on the electronic packing list into the determined location and orientation in the cargo space of the delivery vehicle;
   generate an alert in response to a determination by the control unit of the computing device that the location and orientation of the at least one product in the cargo space as represented by the extracted video capture data deviates from the location and the orientation of the at least one product indicated by the data representing the step-by-step instructions stored in the at least one electronic database for loading the at least one product into the cargo space; and transmit the generated alert from the computing device to the portable electronic device.

10. The system of claim 9, wherein the computing device is configured to receive the electronic packing list from an electronic device remote to the computing device.

11. The system of claim 9,
wherein the electronic data representing at least one of size, weight, and product characteristic parameters for the at least one product on the electronic packing list further includes retrieving a 3-dimensional model of each of the at least one product on the electronic packing list;
wherein the electronic representing at least one of size and shape parameters of the cargo space of the delivery vehicle further includes retrieving a 3-dimensional model of the cargo space of the delivery vehicle;
wherein the product characteristic parameters include at least one of fragile, perishable, frozen, refrigerated, ambient, and bulk designations; and
wherein the packing rules include at least one of lighter cases on top, even weight distribution, crush factors, weight shift, and unloading order.

12. The system of claim 11, wherein the control unit is further configured to determine the location and orientation in the cargo space of the delivery vehicle for loading the at least one product on the electronic packing list based a delivery destination for the at least one product on the electronic packing list.

13. The system of claim 9, wherein the control unit is further configured to transmit to an electronic processor-based device at a product loading location, the step-by-step instructions for loading the at least one product on the electronic packing list into the determined location and orientation in the cargo space of the delivery vehicle.

14. The system of claim 9, wherein the control unit is further configured to check credentials of a worker at a product loading location, and transmit the step-by-step instructions for loading the at least one of the products on the electronic packing list into the determined location and orientation in the cargo space of the delivery vehicle to the electronic processor-based device of the worker when the check indicates that the worker is authorized to load the at least one product into the delivery vehicle, and refusing to transmit the step-by-step instructions to the electronic processor-based device of the worker when the check indicates that the worker is not authorized to load the at least one product into the delivery vehicle.

15. The system of claim 9, wherein the digital images of the cargo space acquired by the camera of the portable electronic device include product identifying data including at least one of barcode data, image recognition data, and radio frequency identification (RFID) data.

16. The system of claim 9, wherein the control unit is further configured to permit a worker at a loading location to deviate from the step-by-step instructions and, in response to an indication that at least one of sequence and location of the loading of the at least one product into the cargo space of the delivery vehicle deviates from the step-by-step instructions:
determine, based at least on the digital images of the cargo space acquired by the camera of the portable electronic device, a modified location and orientation in the cargo space of the delivery vehicle for loading subsequent products on the electronic packing list;
recalculate, based on the determination, modified step-by-step instructions for the loading of the subsequent products on the electronic packing list into the modified location and orientation in the cargo space of the delivery vehicle; and
output, based on the recalculation, the modified step-by-step instructions for the loading of the subsequent products on the electronic packing list into the modified location and orientation in the cargo space of the delivery vehicle.

17. The method of claim 1, wherein the portable electronic device is a hands-free device mountable onto a head or a uniform of a worker at a product loading location where the at least one product is loaded into the cargo space of the delivery vehicle.

18. The system of claim 9, wherein the portable electronic device is a hands-free device mountable onto a head or a uniform of a worker at a product loading location where the at least one product is loaded into the cargo space of the delivery vehicle.

* * * * *

UNITED STATES PATENT AND TRADEMARK OFFICE
CERTIFICATE OF CORRECTION

Page 1 of 1

PATENT NO. : 10,592,842 B2
APPLICATION NO. : 15/366789
DATED : March 17, 2020
INVENTOR(S) : High et al.

It is certified that error appears in the above-identified patent and that said Letters Patent is hereby corrected as shown below:

In the Claims

In Claim 4, on Column 14, Line 53, after "based" insert -- on --.

In Claim 11, on Column 17, Line 21, after "electronic" insert -- data --.

In Claim 12, Column 17, Line 34, after "based" insert -- on --.

Signed and Sealed this
Eleventh Day of August, 2020

Andrei Iancu
*Director of the United States Patent and Trademark Office*